United States Patent
Yoshii et al.

(10) Patent No.: US 11,420,430 B2
(45) Date of Patent: Aug. 23, 2022

(54) POLYPROPYLENE-BASED LAMINATED FILM

(71) Applicant: TOYOBO CO., LTD., Osaka (JP)

(72) Inventors: Tomoya Yoshii, Inuyama (JP); Kazuya Kiriyama, Inuyama (JP); Ryo Takai, Inuyama (JP); Toru Imai, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/252,727

(22) PCT Filed: Jun. 11, 2019

(86) PCT No.: PCT/JP2019/023063
§ 371 (c)(1),
(2) Date: Dec. 15, 2020

(87) PCT Pub. No.: WO2019/244708
PCT Pub. Date: Dec. 26, 2019

(65) Prior Publication Data
US 2021/0213720 A1    Jul. 15, 2021

(30) Foreign Application Priority Data
Jun. 19, 2018 (JP) .............................. JP2018-116035

(51) Int. Cl.
*B32B 27/32* (2006.01)
*B32B 27/08* (2006.01)
*C08K 5/098* (2006.01)
*B32B 27/20* (2006.01)

(52) U.S. Cl.
CPC .............. *B32B 27/32* (2013.01); *B32B 27/08* (2013.01); *C08K 5/098* (2013.01); *B32B 2250/03* (2013.01); *B32B 2250/246* (2013.01); *B32B 2250/40* (2013.01); *B32B 2270/00* (2013.01); *B32B 2307/31* (2013.01); *B32B 2307/54* (2013.01); *B32B 2307/72* (2013.01); *B32B 2439/70* (2013.01)

(58) Field of Classification Search
None
See application file for complete search history.

(56) References Cited

U.S. PATENT DOCUMENTS

2008/0003386 A1    1/2008  Kawai et al.
2008/0161515 A1*   7/2008  Blackmon ............... C08F 10/06
                                                      526/127

FOREIGN PATENT DOCUMENTS

| JP | 2003-011297 A | 1/2003 |
| JP | 2005-280173 A | 10/2005 |
| JP | 2011-173568 A | 9/2011 |
| WO | WO 2017/170244 A1 | 10/2017 |

OTHER PUBLICATIONS

Japanese Patent Office, International Search Report in International Patent Application No. PCT/JP2019/023063 (dated Jul. 23, 2019).
European Patent Office, Extended European Search Report in European Patent Application No. 19822214.3 (dated Feb. 10, 2022).
Chinese National Intellectual Property Administration, First Office Action in Chinese Patent Application No. 201980039694.0 (dated Mar. 25, 2022).
Indian Patent Office, First Examination Report in Indian Patent Application No. 202147001511 (dated Apr. 18, 2022).

\* cited by examiner

*Primary Examiner* — Ramsey Zacharia
(74) *Attorney, Agent, or Firm* — Leydig, Voit & Mayer, Ltd.

(57) ABSTRACT

It is provided that a polypropylene-based laminated film having high heat resistance and stiffness. A polypropylene-based laminated film comprising: a base layer (A) that is formed of a polypropylene-based resin satisfying following conditions 1) to 4) and contains an antifogging agent; and a heat seal layer (B) formed on one or both surfaces of the base layer (A) and formed of a polyolefin-based resin, wherein a lower limit of a plane orientation coefficient of the film is 0.0125, 1) a lower-limit mesopentad fraction is 96%, 2) an upper-limit amount of a copolymerization monomer other than propylene is 0.1 mol %, 3) mass average molecular weight (Mw)/number average molecular weight (Mn) is 3.0 or more and 5.4 or less, and 4) a melt flow rate (MFR) measured at 230° C. and 2.16 kgf is 6.2 g/10 min or more and 9.0 g/10 min or less.

10 Claims, No Drawings

POLYPROPYLENE-BASED LAMINATED FILM

CROSS-REFERENCE TO RELATED APPLICATIONS

This patent application is the U.S. national phase of International Patent Application No. PCT/JP2019/023063, filed Jun. 11, 2019, which claims the benefit of Japanese Patent Application No. 2018-116035, filed Jun. 19, 2018, which are incorporated by reference in their entireties herein.

TECHNICAL FIELD

The present invention relates to a polypropylene-based laminated film that has heat sealing properties and antifogging properties and that is thus appropriate for packing fresh products required to have high freshness, such as vegetables, fruits, and grasses and flowers (hereinafter, these products are referred to as fruits and vegetables in the present specification). The present invention particularly relates in detail to a heat sealable polypropylene-based laminated film having high heat resistance and stiffness.

BACKGROUND ART

Conventionally, stretched films containing polypropylene are used for packing food or various commodities, and one of the stretched films is a film for packing fruits and vegetables that has antifogging properties and is widely used for packing fruits and vegetables such as a vegetable.

Such a polypropylene-based laminated film for packing fruits and vegetables contains an antifogging agent such as a surfactant added thereinto to suppress attachment of water drops in the packing bag. In addition, such a film for packing fruits and vegetables needs to have processability into a bag shape and essentially has fusion sealing through heat melting or heat sealing performance.

Conventional fusion sealable or heat sealable polypropylene-based laminated films, however, have had room for improvement in heat sealing properties at a high temperature and mechanical characteristics (e.g., see Patent Document 1).

PRIOR ART DOCUMENT

Patent Document

Patent Document 1: JP-A-2011-173658

SUMMARY OF THE INVENTION

Problem to be Solved by the Invention

The present invention has been made under the circumstances of such a conventional technical problem. That is, an object of the present invention is to provide a polypropylene-based laminated film having high heat resistance and stiffness and having fusion sealing properties and heat sealing properties.

Solutions to the Problem

As a result of earnest studies by the inventor of the present invention to achieve the object, the present invention has been completed.

That is, the present invention is a polypropylene-based laminated film comprising: a base layer (A) that is formed of a polypropylene-based resin satisfying following conditions 1) to 4) and contains an antifogging agent; and a heat seal layer (B) formed on one or both surfaces of the base layer (A) and formed of a polyolefin-based resin, wherein a lower limit of a plane orientation coefficient of the film is 0.0125,
1) a lower-limit mesopentad fraction is 96%,
2) an upper-limit amount of a copolymerization monomer other than propylene is 0.1 mol %,
3) mass average molecular weight (Mw)/number average molecular weight (Mn) is 3.0 or more and 5.4 or less, and
4) a melt flow rate (MFR) measured at 230° C. and 2.16 kgf is 6.2 g/10 min or more and 9.0 g/10 min or less.

In this case, it is preferable that the film has a heat shrinkage rate at 150° C. in a lengthwise direction and a transverse direction of 8% or less.

Further, in this case, it is preferable that the film has a Young's modulus in a machine direction (MD) of 1.8 GPa or more and a Young's modulus in a transverse direction (TD) of 3.7 GPa or more.

Further, it is preferable that the film has a fusion sealing strength of 20 N/15 mm or more.

Further, it is preferable that the film has a heat seal attainable strength of 3 N/15 mm or more.

Further, it is preferable that the heat seal layer (B) contains a propylene-based random copolymer and/or a propylene-based block copolymer.

Effects of the Invention

The polypropylene-based laminated film having high heat resistance and stiffness according to the present invention can be raised in bag-producing processing speed by setting the heat sealing temperature high and setting the film tension high in a step, and is thus improved in productivity. In addition, heat sealing strength can be improved by setting the heat sealing temperature high.

In addition, improvement in stiffness has led to good appearance of fruits and vegetables packed and arranged as commodities and to contribution to an environmental aspect and the like by reducing the thickness of the film, and has thus been appropriate for packing fruits and vegetables.

MODE FOR CARRYING OUT THE INVENTION

The present invention relates to a heat sealable polypropylene-based laminated film having high heat resistance and stiffness, having fusion sealing properties and heat sealing properties, and being excellent for use of packing application for fruits and vegetables.

Features of the polypropylene-based laminated film according to the present invention attribute to characteristics of a polypropylene resin used in a base layer (A).

The polypropylene-based laminated film according to the present invention includes: a base layer (A) that is formed of a polypropylene-based resin satisfying following conditions 1) to 4) and contains an antifogging agent; and a heat seal layer (B) formed on one or both surfaces of the base layer (A) and formed of a polyolefin-based resin, in which a lower limit of a plane orientation coefficient of the film is 0.0125.
1) A lower-limit mesopentad fraction is 96%.
2) An upper-limit amount of a copolymerization monomer other than propylene is 0.1 mol %.
3) Mass average molecular weight (Mw)/number average molecular weight (Mn) is 3.0 or more and 5.4 or less.

4) A melt flow rate (MFR) measured at 230° C. and 2.16 kgf is 6.2 g/10 min or more and 9.0 g/10 min or less.

The present invention is further described below in detail.

(Base Layer (A))

As the polypropylene resin used in the base layer (A) of the present invention, usable is a polypropylene resin obtained by copolymerizing propylene with ethylene and/or an α-olefin having 4 or more carbon atoms at 0.5 mol % or less. Such a copolymerized polypropylene resin is also included in the polypropylene resin of the present invention. The copolymerization component is preferably 0.3 mol % or less, more preferably 0.1 mol % or less, and a complete homopolypropylene resin containing no copolymerization component is the most preferable.

Copolymerization with ethylene and/or an α-olefin having 4 or more carbon atoms at more than 0.5 mol % may lower crystallinity and stiffness. Such a resin may be used by blending.

The mesopentad fraction ([mmmm] %) that is an index of stereoregularity of the polypropylene resin and is measured by 13C-NMR is preferably 96 to 99.5%. The mesopentad fraction is more preferably 97% or more, further preferably 98% or more. The polypropylene in the base layer (A) that has a small mesopentad fraction lowers the crystalline melting point and may possibly have insufficient elastic modulus and heat resistance at a high temperature. The actual upper limit is 99.5%.

In the polypropylene resin, the Mw/Mn that is an index of a molecular weight distribution is preferably 3.0 to 5.4. The Mw/Mn is more preferably 3.0 to 5.0, further preferably 3.2 to 4.5, particularly preferably 3.3 to 4.0.

When the Mw/Mn of the whole polypropylene resin forming the base layer (A) is 5.4 or less, a high molecular weight component is present but becomes small in amount, so that the heat shrinkage rate tends to be decreased. When the high molecular weight component is present, the high molecular weight component accelerates crystallization of a low molecular weight component, but increases molecular entanglement, thus being a cause of increasing the heat shrinkage rate even though giving high crystallinity.

In addition, when the Mw/Mn of the whole polypropylene resin forming the base layer (A) is 5.4 or less, the low molecular weight component having a substantially low molecular weight is increased, so that the elastic modulus tends to be decreased. This is because the presence of the low molecular weight component having a substantially low molecular weight weakens the molecular entanglement to enable stretching at a low stretching stress and thus increase the crystallinity, but also becomes a factor of lowering the elastic modulus.

When the Mw/Mn of the whole polypropylene resin forming the base layer (A) of the present invention is less than 3.0, the production of the film becomes difficult. The Mw means the mass average molecular weight and the Mn means the number average molecular weight.

The mass average molecular weight (Mw) of the polypropylene resin forming the base layer (A) of the present invention is preferably 180,000 to 500,000. The lower limit of the Mw is more preferably 190,000, further preferably 200,000, and the upper limit of the Mw is more preferably 320,000, further preferably 300,000, particularly preferably 250,000.

The number average molecular weight (Mn) of the polypropylene resin forming the base layer (A) of the present invention is preferably 20,000 to 200,000. The lower limit of the Mn is more preferably 30,000, further preferably 40,000, particularly preferably 50,000, and the upper limit of the Mn is more preferably 80,000, further preferably 70,000, particularly preferably 60,000.

When a gel permeation chromatography (GPC) cumulative curve of the whole polypropylene resin forming the base layer (A) of the present invention is measured, the lower-limit amount of a component having a molecular weight of 100,000 or less is preferably 35 mass %, more preferably 38 mass %, further preferably 40 mass %, particularly preferably 41 mass %, most preferably 42 mass %.

On the other hand, the upper-limit amount of the component having a molecular weight of 100,000 or less in the GPC cumulative curve is preferably 65 mass %, more preferably 60 mass %, further preferably 58 mass %, particularly preferably 56 mass %, most preferably 55 mass %. When the component is in the above range, stretching can be facilitated, the film can decrease thickness unevenness, raising the stretching temperature or the heat fixing temperature can be facilitated, and the heat shrinkage rate can be suppressed further low.

When the gel permeation chromatography (GPC) cumulative curve of the whole polypropylene resin forming the base layer (A) is measured, the lower-limit amount of a component having a molecular weight of 10,000 or less is preferably 1 mass %, more preferably 1.5 mass %.

On the other hand, the upper-limit amount of the component having a molecular weight of 10,000 or less in the GPC cumulative curve is preferably 5 mass %, more preferably 4 mass %, further preferably 3.5 mass %, particularly preferably 3 wt %.

The melt flow rate (MFR: 230° C., 2.16 kgf) of the polypropylene resin at this time is preferably 6.2 g/10 minutes to 10.0 g/10 minutes.

The lower limit of the MFR of the polypropylene resin is more preferably 6.5 g/10 minutes, further preferably 7 g/10 minutes, particularly preferably 7.5 g/10 minutes. The upper limit of the MFR of the polypropylene resin is more preferably 9 g/10 minutes, further preferably 8.5 g/10 minutes, particularly preferably 8.2 g/10 minutes.

When the melt flow rate (MFR: 230° C., 2.16 kgf) is 6.2 g/10 minutes or more, the heat shrinkage rate at a high temperature can be further decreased. Further, the degree of crystallization of the film caused by stretching is enhanced to increase the stiffness, particularly the tensile elastic modulus (Young's modulus) in the width (TD) direction of the film. When the melt flow rate (MFR: 230° C., 2.16 kgf is 9.0 g/10 minutes or less, the production of the film is easily performed without fracture.

The molecular weight distribution of the polypropylene resin can be adjusted by polymerization of different molecular weight components at multiple stages in a serial plant, by offline blending of different molecular weight components with a kneader, by polymerization with a different-performance catalyst blended, or by use of a catalyst capable of attaining a desired molecular weight distribution.

The polypropylene resin can be obtained by polymerizing raw material propylene using a known catalyst such as a Ziegler-Natta catalyst or a metallocene catalyst. Especially, in order to eliminate heterophilic binding, a Ziegler-Natta catalyst, a catalyst enabling high-stereoregularity polymerization is preferably used.

As the method for polymerizing propylene, a known method may be employed. Examples of the known method include a method for performing the polymerization in an inert solvent such as hexane, heptane, toluene, or xylene, a method for performing the polymerization in a liquid monomer, a method for adding a catalyst to a gaseous monomer and performing gas-phase polymerization, and a method for performing the polymerization by combining these methods.

An antifogging agent needs to be added into the polypropylene resin forming the base layer (A). When the antifogging agent is not added, the inside of a package including fruits and vegetables is fogged and the fruits and vegetables are easily perishable, so that the commercial value is lowered.

The mechanism of exerting the antifogging properties of the polypropylene-based laminated film according to the present invention is that the addition of the antifogging agent into the resin forming the base layer (A) allows the antifogging agent to be sequentially transferred to the front heat seal layer (B) during the production of the film and the storage after the formation of the film and thus allows the surface of the film to have the antifogging properties. When fruits and vegetables that have features of maintaining a physiological action even after harvested are an object to be packed, the effect can be exhibited.

In order to maintain excellent long-term antifogging properties in a distribution process, the package is desired to be preserved in a room-temperature atmosphere rather than by freezing. Accordingly, it is preferable to select an antifogging agent exhibiting the antifogging properties continuously during a course of repetitive temperature changes between 5 to 30° C., in consideration of temperature changes during the preservation and the distribution.

Examples of the antifogging agent to be added into the resin forming the base layer (A) of the polypropylene-based laminated film according to the present invention include a fatty acid ester of a polyhydric alcohol, an ethylene oxide adduct of a higher fatty acid amine, and an ester compound of an ethylene oxide adduct of a higher fatty acid amine.

Examples of the fatty acid ester of a polyhydric alcohol include one represented by a general formula (1) below.

General formula (1)

[Mathematical. 1]

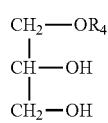

In the general formula (1), $R_4$ is an alkyl group having 12 to 25 carbon atoms.

Examples of the ethylene oxide adduct of a higher fatty acid amine include one represented by a general formula (2) below.

General formula (2)

[Mathematical. 2]

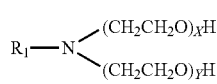

In the general formula (2), $R_1$ is an alkyl group having 12 to 25 carbon atoms, X and Y are each an integer of 1 to 29, and X+Y is an integer of 2 to 30.

Examples of the ester compound of an ethylene oxide adduct of a higher fatty acid amine include one represented by a general formula (3) below.

General formula (3)

[Mathematical. 3]

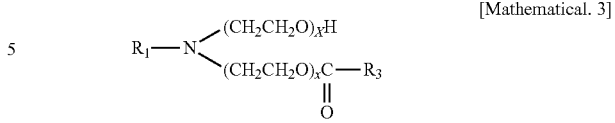

In the general formula (3), $R_2$ and $R_3$ are each an alkyl group having 12 to 25 carbon atoms, X and Y are each an integer of 1 to 29, and X+Y is an integer of 2 to 30.

The content of the fatty acid ester of a polyhydric alcohol in all the layers, the base layer (A) and the heat seal layer (B) is 0.05 to 0.3 wt %, particularly preferably 0.1 to 0.25 wt %.

The content of the ethylene oxide adduct of a higher fatty acid amine in all the layers, the base layer (A) and the heat seal layer (B), is 0.05 to 0.3 wt %, particularly preferably 0.1 to 0.25 wt %.

The content of the ester compound of an ethylene oxide adduct of a higher fatty acid amine in all the layers, the base layer (A) and the heat seal layer (B), is 0.3 to 1.0 wt %, particularly preferably 0.5 to 0.8 wt %.

The content of these three types of antifogging agents in all the layers, the base layer (A) and the heat seal layer (B), is 0.05 to 0.3 wt %, particularly preferably 0.1 to 0.25 wt %. The presence amount in the film is 0.1 to 3 wt %, preferably 0.2 to 0.15 wt %, particularly preferably 0.3 to 1.0 wt % in terms of all the layers.

The polypropylene resin forming the base layer (A) may also contain an additive or another resin therein. Examples of the additive include an antioxidant, an ultraviolet absorbing agent, a nucleating agent, an adhesive, an antistatic agent, a flame retardant, and an inorganic or organic filler. Examples of the other resin include a polypropylene resin other than the polypropylene resin used in the present invention, a random copolymer as a copolymer of propylene with ethylene and/or an α-olefin having 4 or more carbon atoms, and various elastomers. These resins may be used by successive polymerization using a multiple-stage reactor, by blending with the polypropylene resin using a Henschel mixer, by diluting in the polypropylene a master pellet, which is prepared using a melt kneader in advance, so as to give a prescribed concentration, or by melt-kneading all the amounts of resins in advance.

(Heat Seal Layer (B))

In the present invention, preferred as the polyolefin-based resin used in the heat seal layer (B) is a low-melting-point propylene random copolymer having a melting point of 150° C. or less or a propylene block copolymer having a comonomer-containing elastomer component dispersed therein. These copolymers can be used alone or in combination. As the comonomer, it is preferable to use one or more selected from ethylene or an α-olefin having 3 to 10 carbon atoms, such as butene, pentene, hexene, octene, or decene.

The melting point of the propylene random copolymer forming the heat seal layer (B) is desirably set at preferably 60 to 150° C. Such a melting point can give the stretched polypropylene-based resin laminated film sufficient heat sealing strength. When the melting point of the propylene random copolymer forming the heat seal layer (B) is less than 60° C., the heat resistance at a heat sealed portion is poor. When the melting point is more than 150° C., improvement in heat sealing strength cannot be expected. The melting point of the elastomer component contained in the propylene block copolymer is also preferably 150° C. or less.

As regards the MFR, the copolymers have, for example, a MFR in the range of 0.1 to 100 g/10 min, preferably 0.5 to 20 g/10 min, further preferably 1.0 to 10 g/10 min.

The heat seal layer (B) needs to be placed on both surfaces of the base layer (A). When the heat seal layer (B) is place on one surface of the base layer (A), the fusion sealing strength may be deficient. The thickness of the heat seal layer (B) including both the surfaces in total is preferably in the range of 4 to 15% with respect to all the layers of the film. When the thickness is more than 15%, a so-called resin pool, or a fused resin portion during fusion sealing becomes excessively large to lower the fusion sealing strength. When the thickness is 3% or less, the fused resin portion becomes excessively small and the heat sealing property is deficient, and thus make the production of a bag impossible. The thickness of the heat seal layer (B) including both the surfaces in total is more preferably in the range of 14 to 10% with respect to all the layers of the film.

The polyolefin-based resin used in the heat seal layer (B) can be obtained by polymerizing raw material propylene using a known catalyst such as a Ziegler-Natta catalyst or a metallocene catalyst. Especially, in order to eliminate heterophilic binding, using the Ziegler-Natta catalyst, a catalyst enabling high-regularity polymerization, is preferable.

As the method for polymerizing propylene, a known method is acceptable. Examples include a method for performing the polymerization in an inert solvent such as hexane, heptane, toluene, or xylene, a method for performing the polymerization in liquid propylene or ethylene, a method for adding a catalyst into gaseous propylene or ethylene and performing gas-phase polymerization, and a method for performing the polymerization by combining these methods.

A high molecular weight component and a low molecular weight component may be obtained by separate polymerization and then mixed or may be produced with a multiple-stage reactor in a serial plant. Particularly, preferred is a method for obtaining, using a plant including a multiple-stage reactor, a high molecular weight component by first polymerization and then a low molecular weight component by polymerization in the presence of the high molecular weight component.

(Method for Producing Polypropylene Film)

As the polypropylene-based laminated film according to the present invention, a film uniaxially stretched in the longitudinal direction (MD) or in the transverse direction (TD) is acceptable, but a biaxially stretched film is preferable. The biaxial stretching may be sequentially biaxial stretching or simultaneous biaxial stretching.

The polypropylene-based laminated film formed as a stretched film can have a low heat shrinkage rate even at 150° C., which has not been expected with conventional polypropylene-based laminated films.

Hereinafter, a method for producing a sequentially biaxially stretched film by lengthwise stretching-transverse stretching will be described as the most preferable example.

First, a base layer (A) melt-extruded from one extruder and a heat seal layer (B) melt-extruded from the other extruder are laminated to give a laminate of a polypropylene-based resin layer (A) and the heat seal layer (B) in a T-die, and the laminate is cooled and solidified by a cooling roller to give an unstretched sheet. As the melt extrusion conditions, the layers are extruded from the T-die into a sheet shape, with the resin temperature set at 200 to 280° C., and cooled and solidified by the cooling roller at a temperature of 10 to 100° C. to obtain an unstretched film. Next, the unstretched film is stretched by a stretching roller at 120 to 165° C. in the length direction (MD) at 3 to 7 times and sequentially in the width direction (TD) at 6 to 12 times at a temperature of 155° C. to 175° C., preferably 158° C. to 170° C.

Further, the film is heat-treated at an atmospheric temperature of 165 to 175° C., preferably 166 to 173° C., while tolerated at a relaxation of 1 to 15%.

Corona discharge treatment is performed at least one surface of the film if necessary. Then, the film can be wound by a winder to give a roll sample.

The lower limit of the stretch ratio in the MD is preferably 3 times, more preferably 3.5 times. When the stretch ratio is less than the above value, the film may have film-thickness unevenness.

The upper limit of the stretch ratio in the MD is preferably 8 times, more preferably 7 times. When the stretch ratio is more than the above value, the sequentially performed stretching in the TD may become difficult.

The lower limit of the stretching temperature in the MD is preferably 120° C., more preferably 125° C., further preferably 130° C. When the stretching temperature is less than the above value, the film may increase mechanical load, increases the thickness unevenness, or causes roughening of a surface.

The upper limit of the stretching temperature in the MD is preferably 160° C., more preferably 155° C., further preferably 150° C. A higher temperature is preferable to lower the heat shrinkage rate but may make the film attach to the roller to make the stretching impossible.

The lower limit of the stretch ratio in the TD is preferably 4 times, more preferably 5 times, further preferably 6 times. When the stretch ratio is less than the above value, the film may have the thickness unevenness.

The upper limit of the stretch ratio in the TD is preferably 20 times, more preferably 17 times, further preferably 15 times. When the stretch ratio is more than the above value, the heat shrinkage rate may be increased or the film may be fractured during the stretching.

The preheating temperature of the stretching in the TD is preferably set 10 to 15° C. more than the stretching temperature to quickly raise the film temperature to around the stretching temperature.

The stretching in the TD is performed at a higher temperature than the temperature for conventional heat sealable polypropylene laminated stretched films.

The lower limit of the stretching temperature in the TD is preferably 157° C., more preferably 158° C. When the stretching temperature is less than the above value, the film may be not sufficiently softened to be fractured or may increases the heat shrinkage rate.

The upper limit of the stretching temperature in the TD is preferably 170° C., more preferably 168° C. A higher temperature is preferable to lower the heat shrinkage rate, but when the stretching temperature is more than the above value, the low molecular weight component may be fused and recrystallized to cause roughening of a surface or whitening of the film.

The stretched film is heat-fixed. The heat fixation can be performed at a higher temperature than the temperature for conventional polypropylene films. The lower limit of the heat fixing temperature is preferably 165° C., more preferably 166° C. When the heat fixing temperature is less than the above value, the heat shrinkage rate may be increased. In addition, a long heat-fixing time may be needed to lower the heat shrinkage rate, degrading the productivity.

The upper limit of the heat fixing temperature is preferably 175° C., more preferably 173° C. When the heat fixing temperature is more than the above value, the low molecular weight component may be fused and recrystallized to cause roughening of a surface or whitening of the film.

The film is preferably relaxed (loosened) when heat-fixed. The lower limit of the relaxation is preferably 2%, more preferably 3%. When the relaxation is less than the above value, the heat shrinkage rate may be increased.

The upper limit of the relaxation is preferably 10%, more preferably 8%. When the relaxation is more than the above value, the film may increases the thickness unevenness.

Further, in order to lower the heat shrinkage rate, the film produced by the above step can be once wound into a roll shape and then annealed offline.

The lower limit of the offline annealing temperature is preferably 160° C., more preferably 162° C., further preferably 163° C. When the offline annealing temperature is less than the above value, an annealing effect may not be obtained.

The upper limit of the offline annealing temperature is preferably 175° C., more preferably 174° C., further preferably 173° C. When the offline annealing temperature is more than the above value, the film may lower the transparency or increase the thickness unevenness.

The lower limit of the offline annealing time is preferably 0.1 minutes, more preferably 0.5 minutes, further preferably 1 minute. When the offline annealing time is less than the above value, an annealing effect may be not obtained.

The upper limit of the offline annealing time is preferably 30 minutes, more preferably 25 minutes, further preferably 20 minutes. When the offline annealing time is more than the above value, the productivity may be lowered.

The film thickness is set according to application, but the lower limit of the film thickness is preferably 2 μm, more preferably 3 μm, further preferably 4 μm. The upper limit of the film thickness is preferably 300 μm, more preferably 250 μm, further preferably 200 μm, particularly preferably 100 μm, most preferably 50 μm.

The polypropylene film obtained as described above is usually produced as a roll with approximately a width of 2000 to 12000 mm and a length of 1000 to 50000 m and wound into a roll shape. Further, the roll is slit according to application and is supplied as a slit roll with approximately a width of 300 to 2000 mm and a length of 500 to 5000 m.

The polypropylene-based laminated film according to the present invention has excellent characteristics that are described above and that conventional films do not have. When used as a packing film, the polypropylene-based laminated film that has high stiffness can be formed thin and reduced in costs and weight.

In addition, since the polypropylene-based laminated film has high heat resistance, the polypropylene-based laminated film can be dried at a high temperature during drying of coating or printing, and can thus attain production efficiency or allow use of a coating agent, an ink, a laminate adhesive, or the like that has been conventionally difficult to use. The polypropylene-based laminated film does not need a laminating step that uses an organic solvent or the like, and is therefore preferable economically and in terms of global environmental influences.

(Characteristics of Film)

The lower limit of the heat shrinkage rate at 150° C. in the MD and the TD of the polypropylene-based laminated film according to the present invention is preferably 0.5%, more preferably 1%, further preferably 1.5%, particularly preferably 2%, most preferably 2.5%. When the heat shrinkage rate is in the above range, the actual production may be facilitated in terms of costs or the like and the film may decrease the thickness unevenness.

The upper limit of the heat shrinkage rate at 150° C. in the MD is preferably 7%, more preferably 6%, further preferably 5.5%, particularly preferably 5%. When the heat shrinkage rate is in the above range, the film further facilitates the use of application of being possibly exposed to a high temperature of approximately 150° C. The heat shrinkage rate at 150° C. can be adjusted up to approximately 2.5%, for example, by increasing the low molecular weight component or adjusting the stretching conditions or the fixing conditions, but the adjustment of the heat shrinkage rate to 2.5% or less is preferably performed by offline annealing treatment.

Conventional polypropylene-based laminated films have a heat shrinkage rate at 150° C. in the MD of 15% or more and a heat shrinkage rate at 120° C. in the MD of approximately 3%. When the heat shrinkage rate is set in the above range, the polypropylene-based laminated film having excellent heat resistance can be obtained.

The upper limit of the heat shrinkage rate at 150° C. in the TD is preferably 8%, more preferably 7%, further preferably 7%. When the heat shrinkage rate is in the above range, the film further facilitates the use of application of being possibly exposed to a high temperature of approximately 150° C. The heat shrinkage rate at 150° C. can be adjusted up to approximately 2.5%, for example, by increasing the low molecular weight component or adjusting the stretching conditions or the fixing conditions, but the adjustment of the heat shrinkage rate to 2.5% or less is preferably performed by offline annealing treatment.

Conventional polypropylene-based laminated films have a heat shrinkage rate at 150° C. in the TD of 15% or more and a heat shrinkage rate at 120° C. in the TD of approximately 3%. When the heat shrinkage rate is set in the above range, the polypropylene-based laminated film having excellent heat resistance can be obtained.

When the polypropylene-based laminated film according to the present invention is a biaxially stretched film, the lower limit of the Young's modulus (23° C.) in the MD is preferably 1.8 GPa, more preferably 1.9 GPa, further preferably 2.0 GPa, particularly preferably 2.1 GPa, most preferably 2.2 GPa.

The upper limit of the Young's modulus in the MD is preferably 3.7 GPa, more preferably 3.6 GPa, further preferably 3.5 GPa, particularly preferably 3.4 GPa, most preferably 3.3 GPa. When the Young's modulus is in the above range, the actual production may be facilitated and better MD-TD balance may be given.

When the polypropylene-based laminated film according to the present invention is a biaxially stretched film, the lower limit of the Young's modulus (23° C.) in the TD is 3.7 GPa, preferably 4.4 GPa, more preferably 4.5 GPa, further preferably 4.6 GPa, particularly preferably 4.7 GPa.

The upper limit of the Young's modulus in the TD is preferably 8 GPa, more preferably 7.5 GPa, further preferably 7 GPa, particularly preferably 6.5 GPa. When the Young's modulus is in the above range, the actual production may be facilitated and better MD-TD balance may be given.

The Young's modulus can be increased by increasing the stretch ratio. When the MD-TD stretching is performed, the stretch ratio in the MD can be set lower and the stretch ratio in the TD can be set higher to increase the Young's modulus in the TD.

The lower limit of the plane orientation coefficient of the polypropylene-based laminated film according to the present invention is preferably 0.0125, more preferably 0.0126, further preferably 0.0127, particularly preferably 0.0128. The upper limit of the plane orientation coefficient is, as an actual value, preferably 0.0155, more preferably 0.0150, further preferably 0.0148, particularly preferably 0.0145. The plane orientation coefficient can be made within the range by adjusting the stretch ratio. When the plane orientation coefficient is in this range, the film has less thickness unevenness.

The polypropylene-based laminated film according to the present invention has a heat sealing strength at 140° C. of preferably 8.0 N/15 mm or more, more preferably 9.0 N/15 mm or more, further preferably 10 N/15 mm or more.

In addition, the polypropylene-based laminated film according to the present invention has a heat sealing strength at 100° C. of preferably 1.5 N/15 mm or more, more preferably 2.0 N/15 mm or more, further preferably 2.2 N/15 mm or more.

The lower limit of the impact resistance (23° C.) of the polypropylene-based laminated film according to the present invention is preferably 0.6 J, more preferably 0.7 J. When the impact resistance is in the above range, the film has sufficient toughness and is never fractured while handled.

The upper limit of the impact resistance is, in terms of an actual aspect, preferably 3 J, more preferably 2.5 J, further preferably 2.2 J, particularly preferably 2 J. The impact resistance tends to be lowered, for example, when the amount of the low molecular weight component is large, when the entire molecular weight is low, when the amount of the high molecular weight component is small, or when the molecular weight of the high molecular weight component is low. Therefore, adjusting these components according to application enables the impact resistance to fall within the range.

The lower limit of the haze of the polypropylene-based laminated film according to the present invention is, as an actual value, preferably 0.1%, more preferably 0.2%, further preferably 0.3%, particularly preferably 0.4%, most preferably 0.5%.

The upper limit of the haze is preferably 6%, more preferably 5%, further preferably 4.5%, particularly preferably 4%, most preferably 3.5%. When the haze is in the above range, the film may be easily used for application requiring transparency. The haze tends to be deteriorated, for example, when the stretching temperature or the heat fixing temperature is excessively high, when the temperature of the cooling roller (CR) is high and the cooling speed is low, or when the amount of the low molecular weight is excessively large. Therefore, adjusting these states enables the haze to fall within the range.

The lower limit of the thickness uniformity of the polypropylene-based laminated film according to the present invention is preferably 0%, more preferably 0.1%, further preferably 0.5%, particularly preferably 1%.

The upper limit of the thickness uniformity is preferably 20%, more preferably 17%, further preferably 15%, particularly preferably 12%, most preferably 10%. When the thickness uniformity is in the above range, the film is less likely to generate a defect during post processing such as coating or printing and is easily used for application requiring accuracy.

EXAMPLES

Hereinafter, the present invention is described in detail on the basis of examples. The present invention, however, is not to be limited to the examples. The methods for measuring the physical properties in the examples are as follows.

1) Melt Flow Rate (MFR, g/10 Minutes)

The MFR was measured at a temperature of 230° C. in conformity with JIS-K7210.

2) Molecular Weight and Molecular Weight Distribution

The molecular weight and the molecular weight distribution were obtained using gel permeation chromatography (GPC) according to the monodisperse polystyrene standard. The column and the solvent used in the GPC measurement are as follows.

Solvent: 1,2,4-trichlorobenzene, column: TSKgel GMH$_{HR}$-H(20) HT×3

Flow rate: 1.0 ml/min

Detector: RI

Measurement temperature: 140° C.

The number average molecular weight (Mn), the mass average molecular weight (Mw), the Z+1 average molecular weight (Mz+1) are respectively defined by the following equations of the number of molecules (Ni) of the molecular weight (Mi) at each elution position of a GPC curve obtained via a molecular weight calibration curve.

Number average molecular weight: $Mn=\Sigma(Ni \cdot Mi)/\Sigma Ni$

Mass average molecular weight: $Mw=\Sigma(Ni \cdot Mi^2)/\Sigma(Ni \cdot Mi)$

Z+1 average molecular weight: $Mz+1=\Sigma(Ni \cdot Mi^4)/\Sigma(Ni \cdot Mi^3)$ Molecular weight distribution: $Mw/Mn, Mz+1/Mn$ The molecular weight at the peak position in the GPC curve was defined as Mp.

When the base line is unclear, a base line is to be set in the range to the lowest position of the foot on a high molecular weight side of the high-molecular-weight-side elution peak nearest to the elution peak of the standard substance.

As peak separation, the peak in the obtained GPC curve was separated into two or more components having different molecular weights. On the assumption of Gaussian function, the molecular weight distribution of each component was based on Mw/Mn=4 so as to become similar to the molecular weight distribution of normal polypropylene. The average molecular weight was calculated from the obtained curve of each component.

3) Stereoregularity

The mesopentad fraction ([mmmm]%) and the average meso chain length were measured using $^{13}$C-NMR. The mesopentad fraction was calculated in accordance with the method described in Macromolecules (Zambelli et al. (1973), vol. 6, p. 925), and the average meso chain length was calculated in accordance with the method described in "Polymer Sequence Distribution" (J. C. Randall (1977), second chapter, Academic Press, New York).

The $^{13}$C-NMR measurement was performed at 110° C. by dissolving 200 mg of a sample in a mixed liquid containing o-dichlorobenzene and deuterated benzene at 8:2 at 135° C. using AVANCE 500 manufactured by BRUKER.

4) Melting Point Tm

The melting point was measured by a differential scanning calorimeter (DSC) in accordance with JIS K7121.

As a state adjustment, the temperature was raised from room temperature to 200° C. at 30° C./min, retained at 200° C. for 5 minutes, lowered to −100° C. at 10° C./min, and retained at −100° C. for 5 minutes. Then, the temperature was raised from −100° C. to 200° C. at 10° C./min for measurement of a heat absorption curve.

When the heat absorption curve includes a plurality of fusion peaks, the fusion peak having the maximum temperature was defined as the melting point in the case of the heat seal layer (C). The fusion peak having the minimum temperature was defined as the melting point in the case of the base layer (A).

5) Thickness

A 1-m-long square sample was cut out from a wound film roll, equally divided into 10 pieces respectively in the MD and the TD to give 100 measurement samples. The thickness at an almost central portion of each measurement sample was measured by a contact-type film thickness gauge.

The average value of the obtained 100 data was obtained.

6) Haze (Unit: %)

The haze was measured in accordance with JIS K7105.

7) Refractive Index, Plane Orientation Coefficient

The refractive index was measured by JIS K7142-1996 5.1 (method A) using an Abbe refractometer manufactured by ATAGO CO., LTD. The refractive indexes along the MD and the TD were respectively defined as Nx and Ny, and the refractive index in the thickness direction was defined as Nz. The plane orientation coefficient (ΔP) was obtained by the formula (Nx+Ny)/2−Nz.

8) Wet Tension (mN/m)

According to K6768: 1999, the wet tension of a surface of the heat seal layer was measured by the following procedures after the film was aged at 23° C. and a relative humidity of 50% for 24 hours.

Procedure 1)

The measurement is performed in a standard test room atmosphere (see JIS K7100) at a temperature of 23° C. and a relative humidity of 50%.

Procedure 2)

A sample piece is put on a substrate of a hand coater (4.1), and several drops of a test mixed liquid are dropped onto the test piece and immediately spread by a wire bar.

When a cotton swab or a brush is used to spread the test mixed liquid, the liquid is quickly spread in an area of at least 6 cm² or more. The liquid is used in such an amount as not to make a pool but as to form a thin layer.

The determination of the wet tension is performed by observing the liquid film of the test mixed liquid in bright light and with respect to the state of the liquid film after 3 seconds. Retaining the state of the application for 3 seconds or more without generating a breakup of the liquid film means that the sample piece is wet. When the wet state is retained for 3 seconds or more, the measurement is further progressed, next using a high surface-tension mixed liquid. Conversely, when the liquid film is broken in 3 seconds or less, the measurement is progressed, next using a low surface-tension mixed liquid.

This operation is repeated to select a mixed liquid that is capable of wetting the surface of the test piece accurately at 3 seconds.

Procedure 3)

A new cotton swab is used for each test. The brash or the wire bar is washed with methanol and dried every use because a residual liquid is evaporated and changes the composition and the surface tension of the test mixed liquid.

Procedure 4)

The operation of selecting a mixed liquid capable of wetting the surface of the test piece at 3 seconds is performed at least 3 times. The surface tension of the mixed liquid selected as described above is reported as the wet tension of the film.

9) Antifogging Properties

[1] Hot water (300 cc) at 50° C. is poured into a 500-cc upper opening vessel.

[2] The opening of the vessel is sealed with the film whose antifogging measurement surface is set inside.

[3] The vessel is left in a cool room at 5° C.

[4] The dew attachment state of the film surface was evaluated by 5 criteria, with the hot water in the vessel completely cooled to an atmospheric temperature.

First grade: no dew on whole surface (attachment area 0)
Second grade: attachment of some dew (attachment area: up to ¼)
Third grade: about ½ attachment of dew (attachment area: up to 2/4)
Fourth grade: mostly attachment of dew (attachment area: up to ¾)
Fifth grade: attachment of dew on whole surface (attachment area: ¾ or more)

10) Heat Sealing Strength

Heat seal layers of the polypropylene-based laminated film that enabled automatic packing were overlaid facing each other and heat sealed using a heat gradient tester (manufactured by Toyo Seiki Seisaku-sho, Ltd.) at 100° C. and 140° C. and a heat sealing pressure of 1 kg/cm² for a time of 1 second. Then, a central portion of the heat-sealed portion was cut at a width of 15 mm and fixed at upper and lower chucks of a tensile tester, and the heat sealing strength was calculated from the heat sealing strength when the film was pulled at a tensile speed of 200 mm/min (unit: N/15 mm).

11) Fusion Sealing Strength

The polypropylene-based laminated film that enabled automatic packing was formed into a fusion sealed bag using a fusion sealer (manufactured by Kyoei Co., Ltd.: model PP500).

Conditions: fusion blade, edge angle of 60°
Sealing temperature: 370° C.
Number of shots: 120 bags/min The fusion sealed portion of the fusion sealed bag was cut at a width of 15 mm, both ends of the cut piece was held without slack by holding portions (holding gap: 200 mm) of a tensile tester, pulled at a tensile speed of 200 mm/min, and the fusion sealing strength (N/15 mm) was calculated from the strength when the sealed portion was fractured. The measurement was performed 5 times, and the measurement values were averaged. The film having a fusion sealing strength of 20 N/15 mm or more was determined to have good fusion sealability.

12) Impact Strength

The impact strength was measured at 23° C. using a film impact tester manufactured by Toyo Seiki Seisaku-sho, Ltd.

13) Heat Shrinkage Rate (%)

The heat shrinkage rate was measured in conformity with JIS Z 1712.

(The stretched film was cut at a width of 20 mm and a length of 200 mm respectively in the MD and the TD and heated for 5 minutes while hang in a hot air oven at 150° C. The length of the heated film was measured, and the heat shrinkage rate was obtained by the ratio of the shrunken length to the original length.)

14) Young's Modulus (Unit: GPa)

The Young's moduli in the MD and the TD were measured at 23° C. in conformity with JIS K 7127.

15) Curling Tendency

The degree of curling of a laminated stretched film obtained in the evaluation 9) was measured by visual inspection.

○: No curling tendency
Δ: Some curling tendency
×: Significant curling tendency

16) Appearance of Heat-Sealed Film

A prepared film and a PYLEN film (CT P1128) manufactured by TOYOBO CO., LTD. were overlaid on top of another and heat-sealed using a test sealer manufactured by NISHIBE KIKAI CO., LTD. with retention at 170° C. and a load of 2 kg for 1 second. The state of a change in appearance caused by shrinkage of the heat-sealed film was evaluated by visual inspection.

◯: The deformation is small at the heat-sealed portion and does not affect the use.

x: The shrinkage caused by the heat sealing is large, and the deformation is large.

17) Base Layer (A) Resin Composition

To [PP-1] to [PP-6] shown in Table 1 were added 0.16 wt % of glycerin monostearate (manufactured by Matsumoto Yushi-Seiyaku Co., Ltd., TB-123) as the antifogging agent, 0.2 wt % of polyoxyethylene(2) stearyl amine (manufactured by Matsumoto Yushi-Seiyaku Co., Ltd., TB-12), and 0.6 wt % of polyoxyethylene(2) stearyl amine monostearate (manufactured by Matsumoto Yushi-Seiyaku Co., Ltd., Elex 334). Those obtained by the addition were respectively defined as [PP-11] to [PP-16] shown in Table 2 and used in an amount of 100 wt % as the resin forming the base layer (A).

Example 1

Using two melt extruders, melt coextrusion was performed, with a first extruder set for the base layer (A) containing, as the polypropylene resin, the polypropylene homopolymer PP-11 shown in Table 2, and with a second extruder set for the heat seal layer (B) containing a mixed resin obtained by mixing 85 wt % of a propylene-ethylene-butene random copolymer (PP-7: Pr-Et-Bu, density: 0.89 g/cm$^3$, MFR: 4.6 g/10 minutes, melting point 128° C.) and 15 wt % of a propylene-butene random copolymer (PP-8: Pr-Bu, density: 0.89 g/cm$^3$, MFR: 9.0 g/10 minutes, melting point 130° C.). The base layer (A) and the heat seal layer (B) were laminated in this order to give a laminate of heat seal layer (B)/base layer (A)/heat seal layer (B) in a T-die and melt coextruded at 250° C. from the die into a sheet shape by a T-die method. Then, the laminate was cooled and solidified by a cooling roller at 30° C., then stretched at 125° C. and at 4.5 times in the length direction, next sandwiched at both ends with clips and guided into a hot air oven to be preheated at 175° C., then stretched at 160° C. and at 8.2 times in the transverse direction, and next heat-treated at 170° C. with a relaxation of 6.7% to give a film. Thereafter, the film had both surfaces thereof corona treated and wound by a winder. Table 3 shows the film production conditions.

The film obtained as described above had a thickness of 20 µm, and the laminated stretched film was obtained with the base layer having a thickness of 18.8 µm and the heat seal layers each having a thickness of 0.6 µm.

As shown in Table 4, the obtained laminated stretched film satisfies the requirements of the present invention, with a low heat shrinkage rate and high stiffness, and was also excellent in the heat sealing strength, the touch, and the curling tendency.

Example 2

A polypropylene-based laminated film was obtained in the same manner as in Example 1 except that the raw material used in the base layer (A) was changed to PP-12 shown in Table 2.

As shown in Table 4, the obtained laminated stretched film satisfies the requirements of the present invention, with a low heat shrinkage rate and high stiffness, and was also excellent in the heat sealing strength, the touch, and the curling tendency.

Comparative Example 1

A polypropylene-based laminated film was obtained in the same manner as in Example 1 except that the raw material used in the base layer (A) was changed to PP-13 shown in Table 2.

As shown in Table 4, the obtained laminated stretched film was excellent in the heat sealing strength, the touch, and the curling tendency but had a large heat shrinkage rate.

Comparative Example 2

A polypropylene-based laminated film was attempted to be obtained in the same manner as in Example 1 except that the raw material used in the base layer (A) was changed to PP-14 shown in Table 2. The film, however, was fractured halfway, and a sample could not be obtained.

Comparative Example 3

A polypropylene-based laminated film was obtained in the same manner as in Example 1 except that the raw material used in the base layer (A) was changed to PP-15 shown in Table 2.

As shown in Table 4, the obtained laminated stretched film was excellent in the heat sealing strength, the touch, and the curling tendency but had a large heat shrinkage rate.

Comparative Example 4

A polypropylene-based laminated film was obtained in the same manner as in Example 1 except that the raw material used in the base layer (A) was changed to PP-16 shown in Table 2, the preheating temperature for stretching in the width direction was changed to 170° C., the stretching temperature in the width direction was changed to 158° C., and the heat fixing temperature was changed to 165° C.

As shown in Table 4, the obtained laminated stretched film was excellent in the heat sealing strength, the touch, and the curling tendency but had a very large heat shrinkage rate.

Comparative Example 5

A polypropylene-based laminated film was obtained in the same manner as in Example 1 except that the raw material used in the base layer (A) was changed to PP-1 shown in Table 1. As shown in Table 4, the obtained laminated stretched film did not exert the antifogging properties.

TABLE 1

| Polypropylene, type | PP-1 | PP-2 | PP-3 | PP-4 | PP-5 | PP-6 | PP-7 | PP-8 |
|---|---|---|---|---|---|---|---|---|
| Raw material monomer | Propylene | Propylene | Propylene | Propylene | Propylene | Propylene Ethylene | Propylene Ethylene Butene | Propylene Butene |

TABLE 1-continued

| Polypropylene, type | PP-1 | PP-2 | PP-3 | PP-4 | PP-5 | PP-6 | PP-7 | PP-8 |
|---|---|---|---|---|---|---|---|---|
| Resin regularity (mesopentad fraction (%)) | 98.7 | 98.1 | 98.7 | 98.3 | 98.0 | 95.0 | 95 or less | 95 or less |
| MFR (g/10 min, 230° C., 2.16 kgf) | 6.5 | 8.0 | 6.0 | 11.0 | 3.0 | 2.5 | 4.6 | 9.0 |
| Molecular weight (Mn) | 58,000 | 65,000 | 70,000 | 46,000 | 39,000 | 81,000 | 62,000 | 59,000 |
| Molecular weight (Mw) | 250,000 | 240,000 | 280,000 | 200,000 | 350,000 | 320,000 | 270,000 | 230,000 |
| Molecular weight distribution (Mn/Mw) | 4.3 | 3.7 | 4.0 | 4.3 | 9.0 | 4.0 | 4.4 | 3.9 |
| Content of component having a molecular weight of 100,000 or less in GPC cumulative curve (mass %) | 41 | 46 | 39 | 56 | 40 | 29 | 36 | 48 |
| Content of component having a molecular weight of 10,000 or less in GPC cumulative curve (mass %) | 2 | 3 | 9 | 4 | 5 | 1 | 1 | 3 |
| Melting point (° C.) | 170 | 170 | 170 | 170 | 170 | 165 | 128 | 130 |

TABLE 2

| Polypropylene type and antifogging agent of base layer (A) | PP-11 | PP-12 | PP-13 | PP-14 | PP-15 | PP-16 |
|---|---|---|---|---|---|---|
| Base polymer | PP-1 | PP-2 | PP-3 | PP-4 | PP-5 | PP-6 |
| Content of glycerin monostearate (weight %) | 0.16 | 0.16 | 0.16 | 0.16 | 0.16 | 0.16 |
| Content of polyoxyethylene(2) stearyl amine (weight %) | 0.2 | 0.2 | 0.2 | 0.2 | 0.2 | 0.2 |
| Content of polyoxyethylene(2) stearyl amine monostearate (weight %) | 0.6 | 0.6 | 0.6 | 0.6 | 0.6 | 0.6 |

TABLE 3

| Film formation condition | a | b |
|---|---|---|
| Melted resin temperature (° C.) | 250 | 250 |
| Cooling roll temperature (° C.) | 30 | 30 |
| Stretch ratio in MD direction (times) | 4.5 | 4.5 |
| MD stretching temperature (° C.) | 125 | 125 |
| Stretch ratio in TD direction (times) | 8.2 | 8.2 |
| TD stretch preheating temperature (° C.) | 175 | 170 |
| TD stretching temperature (° C.) | 160 | 158 |
| Heat fixing temperature (° C.) | 170 | 165 |
| Rate of Relaxing in TD (%) | 6.7 | 6.7 |

TABLE 4

| | | | | Example 1 | Example 2 | Comparative Example 1 | Comparative Example 2 | Comparative Example 3 | Comparative Example 4 | Comparative Example 5 |
|---|---|---|---|---|---|---|---|---|---|---|
| Base layer (A) | Raw material | PP-11 | weight % | 100 | 0 | 0 | 0 | 0 | 0 | 0 |
| | | PP-12 | weight % | 0 | 100 | 0 | 0 | 0 | 0 | 0 |
| | | PP-13 | weight % | 0 | 0 | 100 | 0 | 0 | 0 | 0 |
| | | PP-14 | weight % | 0 | 0 | 0 | 100 | 0 | 0 | 0 |
| | | PP-15 | weight % | 0 | 0 | 0 | 0 | 100 | 0 | 0 |
| | | PP-16 | weight % | 0 | 0 | 0 | 0 | 0 | 100 | 0 |
| | | PP-1 | weight % | 0 | 0 | 0 | 0 | 0 | 0 | 100 |
| | Thickness | | μm | 18.8 | 18.8 | 18.8 | 18.8 | 18.8 | 18.8 | 18.8 |
| Heat seal Layer (B) | Raw material | PP-7 | weight % | 85 | 85 | 85 | 85 | 85 | 85 | 85 |
| | | PP-8 | weight % | 15 | 15 | 15 | 15 | 15 | 15 | 15 |
| | Thickness | | μm | 1.2 | 1.2 | 1.2 | 1.2 | 1.2 | 1.2 | 1.2 |
| | Film formation condition (see table 2) | | | Film formation condition a | Film formation condition a | Film formation condition a | Film formation condition a | Film formation condition a | Film formation condition b | Film formation condition a |
| Film physical properties | Thickness | | μm | 20 | 20 | 20 | Film was not formed due to breakage of film | 20 | 20 | 20 |
| | Haze | | % | 3.3 | 33 | 3.2 | | 3.4 | 3.0 | 3.0 |
| | Refractive index Nx | | — | 1.508 | 1.507 | 1.508 | | 1.503 | 1.502 | 1.509 |
| | Refractive index Ny | | — | 1.522 | 1.522 | 1.521 | | 1.521 | 1.512 | 1.520 |
| | Refractive index Nz | | — | 1.501 | 1.502 | 1.501 | | 1.502 | 1.502 | 1.502 |
| | Plane orientation coefficient | | — | 0.014 | 0.013 | 0.014 | | 0.010 | 0.005 | 0.013 |
| | Degree of crystallization at 150° C. | | % | 56 | 57 | 56 | | 55 | 42 | 57 |
| | Wetting tension | | mN/m | 40 | 39 | 39 | | 40 | 37 | 40 |
| | Antifogging properties | | Rank | 1~2 | 1~2 | 1~2 | | 1~2 | 1~2 | 1~2 |
| | Heat sealing strength at 100° C. | | N/15 mm | 2.3 | 2.3 | 2.1 | | 2.0 | 2.1 | 2.3 |
| | Heat sealing strength at 140° C. | | N/15 mm | 10.6 | 10.1 | 10.5 | | 10.1 | 10.8 | 10.6 |
| | Fusion sealing properties | | Determination | good | good | good | | good | good | good |

TABLE 4-continued

|  |  | Example 1 | Example 2 | Comparative Example 1 | Comparative Example 2 | Comparative Example 3 | Comparative Example 4 | Comparative Example 5 |
|---|---|---|---|---|---|---|---|---|
| impact strength (23° C.) | Impact strength (23° C.) | 0.7 | 0.7 | 0.8 |  | 0 8 | 0.8 | 0.8 |
| Heat shrinkage rate in MD at 150° C. | % | 5.3 | 5.1 | 5.7 |  | 5.8 | 27.0 | 5.2 |
| Heat shrinkage rate in TB at 150° C. | % | 7.1 | 6.7 | 8.6 |  | 8.3 | 38.0 | 7.0 |
| Young's modulus in MD | GPa | 2.3 | 2.3 | 2.4 |  | 2.5 | 2.0 | 2.3 |
| Young's modulus in TB | GPa | 4.7 | 4.9 | 4.7 |  | 4.6 | 4.0 | 4.9 |
| Sealing strength at 100° C. | N/15 mm | 2.3 | 2.3 | 2.1 |  | 20 | 2.1 | 2 3 |
| Sealing strength at 140° C. | N/15 mm | 10.6 | 10.1 | 10.5 |  | 10.1 | 10.8 | 10.6 |
| Curling property | (○, Δ, x) | ○ | ○ | Δ |  | Δ | x | ○ |
| Appearance after heat-sealing | (○, Δ, x) | ○ | ○ | x |  | x | x | ○ |

The polypropylene-based laminated film having high heat resistance and stiffness according to the present invention can be raised in bag-producing processing speed by setting the heat sealing temperature high and setting the film tension high in a step, and is thus improved in productivity. In addition, heat sealing strength can be improved by setting the heat sealing temperature high.

In addition, improvement in stiffness leads to good appearance of fruits and vegetables packed and arranged as commodities and to contribution to an environmental aspect and the like by reducing the thickness of the film, and is thus appropriate for packing fruits and vegetables.

Therefore, the polypropylene-based laminated film substantially contributes to industry.

The invention claimed is:

1. A polypropylene-based laminated film comprising: a base layer (A) that is formed of a polypropylene-based resin satisfying following conditions 1) to 4) and contains an antifogging agent; and a heat seal layer (B) formed on one or both surfaces of the base layer (A) and formed of a polyolefin-based resin, wherein a lower limit of a plane orientation coefficient of the film is 0.0125,
  1) a lower-limit mesopentad fraction is 96%,
  2) an upper-limit amount of a copolymerization monomer other than propylene is 0.1 mol %,
  3) mass average molecular weight (Mw)/number average molecular weight (Mn) is 3.0 or more and 5.4 or less, and
  4) a melt flow rate (MFR) measured at 230° C. and 2.16 kgf is 6.2 g/10 min or more and 9.0 g/10 min or less.

2. The polypropylene-based laminated film according to claim 1, wherein the film has a heat shrinkage rate at 150° C. in a lengthwise direction and a transverse direction of 8% or less.

3. The polypropylene-based laminated film according to claim 1, wherein the film has a Young's modulus measured at a temperature of 23° C. in a machine direction (MD) of 1.8 GPa or more and a Young's modulus measured at a temperature of 23° C. in a transverse direction (TD) of 3.7 GPa or more.

4. The polypropylene-based laminated film according to claim 1, wherein the film has a fusion sealing strength of 20 N/15 mm or more.

5. The polypropylene-based laminated film according to claim 1, wherein the film has a heat seal attainable strength of 3 N/15 mm or more.

6. The polypropylene-based laminated film according to claim 1, wherein the heat seal layer (B) contains a propylene-based random copolymer and/or a propylene-based block copolymer.

7. The polypropylene-based laminated film according to claim 2, wherein the film has a Young's modulus measured at a temperature of 23° C. in a machine direction (MD) of 1.8 GPa or more and a Young's modulus measured at a temperature of 23° C. in a transverse direction (TD) of 3.7 GPa or more.

8. The polypropylene-based laminated film according to claim 7, wherein the film has a fusion sealing strength of 20 N/15 mm or more.

9. The polypropylene-based laminated film according to claim 8, wherein the film has a heat seal attainable strength of 3 N/15 mm or more.

10. The polypropylene-based laminated film according to claim 9, wherein the heat seal layer (B) contains a propylene-based random copolymer and/or a propylene-based block copolymer.

* * * * *